United States Patent Office 3,367,140
Patented Feb. 6, 1968

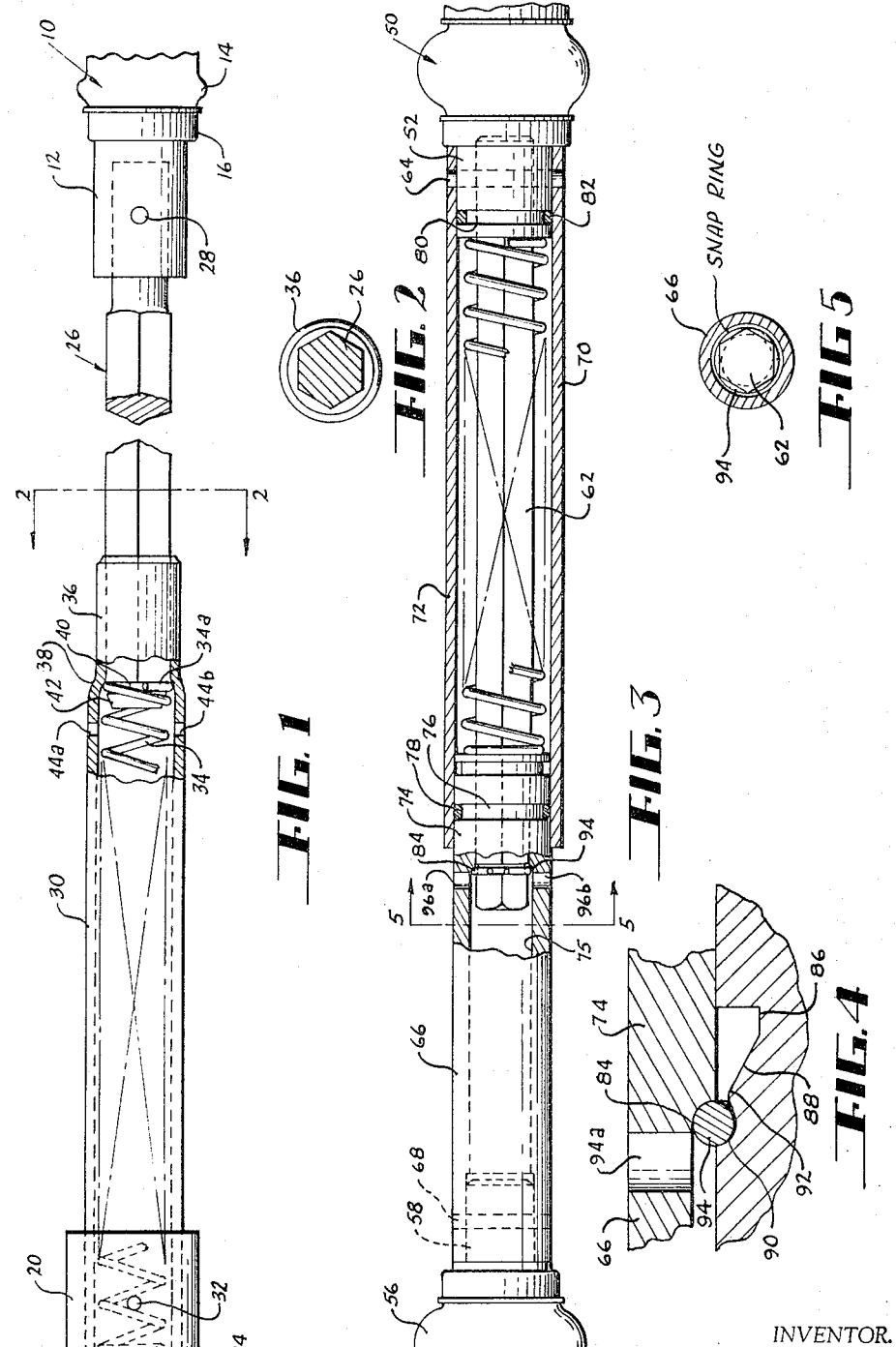

3,367,140
TORQUE COUPLING
George B. Stillwagon, Jr., Dayton, Ohio, assignor of one-half to Kenneth G. Fraser, Dayton, Ohio
Filed Feb. 4, 1965, Ser. No. 430,267
4 Claims. (Cl. 64—23)

ABSTRACT OF THE DISCLOSURE

A torque coupling of adjustable length wherein a non-circular rod slides in a complementary non-circular tubular member and the sliding movement of the rod is limited by a snap ring received in an annular groove formed in a non-circular rod. In one embodiment, a recess is provided in the rod to inoperatively store the snap ring. Movement of the snap ring from said recess to an operative position is accomplished by relative movement between the rod and the tubular member.

---

This invention relates to a torque coupling and more particularly to a locking mechanism for limiting the axial movement of a telescopic torque coupling. However, the invention is not necessarily so limited.

In mechanical power transmission systems there is frequently a need for a torque transmitting coupling which is required to have an axially adjustable length so as to accommodate limited axial movements between the driving and driven members. Such torque transmitting couplings are conveniently telescopic couplings. In constructing telescopic torque transmitting couplings, difficulties are encountered in limiting the axial adjustment in such fashion that the telescoping members of the coupling will not disengage. The difficulties are particularly severe in assemblies where disassembly of the telescopic coupling for repair, or other purposes, must be anticipated. In such cases, a locking device limiting axial separation of the telescopic members, but capable of disengagement for disassembly and repair, is needed.

An object of the present invention is to provide an improved telescopic torque coupling.

Another object of the present invention is to provide an improved telescopic torque coupling which includes lock means to limit axial adjustment of the torque coupling, so designed as to be conveniently disengaged for disassembly of the torque coupling.

A further object of the present invention is to provide an axially adjustable torque coupling of simplified construction.

Other objects and advantages reside in the construction of parts, the combination thereof, the method of manufacture and the mode of operation, as will become more apparent from the following description.

In the drawing,

FIGURE 1 is a fragmentary side elevation view, with portions broken away, illustrating a torque coupling embodying the present invention.

FIGURE 2 is a section view taken substantially along the line 2—2 in FIGURE 1.

FIGURE 3 is a fragmentary side elevation view, with a portion in section and other portions broken away, illustrating a modification.

FIGURE 4 is a fragmentary enlarged view illustrating a portion of FIGURE 3 in greater detail.

FIGURE 5 is a section view taken substantially along the line 5—5 of FIGURE 3.

A typical application for torque couplings of the type to which the present invention is directed is torque connection between adjacent universal joints in a flexible drive, such as may be used for adjustable multiple spindle drill drives. FIGURE 1 illustrates such an application.

Thus, FIGURE 1 schematically illustrates a universal joint 10 having a coupling socket 12 and protected by a sleeve 14 clamped to the coupling socket 12 by means of a ferrule 16. Spaced from the joint 10 is a second universal joint 18, also having a coupling socket 20, and a protective sleeve 22 clamped to the coupling socket 20 by means of a ferrule 24. The torque coupling of the present invention is employed to transmit torque between the sockets 12 and 20 of the two universal joints.

The torque coupling includes an elongated rod 26 telescopically received within a tube 30. One end of the rod 26 is seated in the coupling socket 12 of the universal joint 10 and secured therein by a dowel 28. The tube 30 is seated within the coupling socket 20 of the universal joint 18 and secured therein by a dowel 32. A spring 34, disposed within the interior of the tube 30, biases the rod 26 outwardly of the tube 30.

Torque transmission between the rod 26 and the tube 30 is accomplished with a hexagonal configuration at the periphery of the rod 26 as shown in FIGURE 2, and a complementary hexagonal inner periphery in a section 36 of the tube 30 which receives the rod 26. The torque transmission of the present coupling thus results from the angles between the adjacent faces of the rod 26, which project into corresponding angular recesses between the adjacent faces in the inner periphery of the section 36 of the tube 30. Obviously the same type of torque coupling will result from any interfitting polygonal elements, as well as serrations or splines.

The hexagonal inner periphery of the section 36 of the tube 30 is produced by a swaging operation, wherein the diameter of the tube 30 is reduced as the hexagonal section 36 is formed. The swaging operation results in formation of a divergent wall portion 38 connecting the swaged section 36 with the remaining section or extension of the tube 30. This divergent wall portion 38 is used in co-operation with the spring 34 to limit axial movement of the rod 26 within the tube 30 and thereby prevent unintended removal of the rod 26 from the tube 30.

To this end the rod 26 is provided with a peripheral annular groove 40 adjacent its inner end, the groove 40 cutting through the peripheral angles formed by the adjacent faces of the rod 26. Between the groove 40 and the extreme inner end of the rod 26, the rod 26 has a conical surface 42 converging toward the inner end of the rod. This conical surface 42 is used in the assembly of the torque coupling for guiding a terminal convolution of the spring 34 into the groove 40.

Thus, the spring 34 is provided with an internal diameter which is slightly less than the diameter of the groove 40 at the base of the groove. In order to seat the terminal convolution of the spring 34 in the groove 40, it is therefore necessary to slightly expand the terminal convolution by moving the convolution axially along the surface 42 so that the margin between the surface 42 and the groove 40 can be cleared by said terminal convolution. When the largest diameter of the conical surface 42 has been cleared by the terminal convolution of the spring 34 the terminal convolution snaps into the groove 40. In the preferred construction, the terminal convolution of the spring 34 is circular, rather than helical, for at least the final 180° of the convolution, whereby the terminal convolution occupies at least 180° of the groove 40. This helps to insure that the terminal convolution is firmly secured in the groove 40.

In the preferred construction the base of the groove 40 defines a circle concentric to the longitudinal axis of the rod 26. The diameter of the wire forming the spring 34 added to the radius of the circle occupied by the base of the groove 40 is arranged to be greater than the minimum radial separation of the faces of the rod 26 from the longitudinal axis of the rod 26. Thus, the portion of the terminal convolution of the spring 34 seated in the groove 40 necessarily projects radially above the faces of the rod 26 traversed by the terminal convolution. The extent of projection of the wire in the terminal convolution of the spring 34 is also arranged to exceed the clearance for a slip fit between the rod 26 and the hexagonal section 36 of the tube 30. In consequence, the spring 34 seated in the groove 40 provides an obstruction, adjacent each face of the rod 26 traversed by the terminal convolution of the spring 34, to removal of the rod 26 from the tube 30. The obstruction results from an interference between the portions of the terminal convolution of the spring 34 which project above the faces of the rod 26 and the divergent wall portion 38 of the tube 30. Due to this interference the rod 26 cannot be removed from the tube 30, except by shear of the terminal convolution of the spring 34. The greater the number of faces of the rod 26 traversed by the terminal convolution, the greater the force required to free the rod 26.

For purposes of assembly and disassembly, the tube 30 is provided with apertures, such as shown at 44a and 44b, in the wall thereof adjacent to divergent wall 38. For assembly, a pin, not shown, inserted in either aperture is used to block movement of the terminal convolution of the spring 34, to the left as viewed in FIGURE 1, so that the conical surface 42 of the rod 26 can be forced into the terminal convolution, thereby seating the terminal convolution into the groove 40 and locking the rod 26 against removal from the tube 30.

For disassembly the same, or a similar pin is inserted into either of the apertures 44a or 44b after thrusting the rod 26 inwardly of the tube 30 a distance sufficient to move the groove 40 to the left of the apertures as viewed in FIGURE 1. Upon subsequent retraction of the rod 26, the pin engages the terminal convolution of the spring 34 seated in the groove 40 and thereby causes the terminal convolution to pull out of the groove 40. This disassembly technique is most efficient when the pin inserted in the aperture 44a or 44b engages the terminal convolution at approximately the point where such convolution first enters the groove 40. To insure a favorable point of engagement between the pin and the terminal convolution of the spring, a number of apertures as shown at 44a and 44b may be placed around the periphery of the tube 30.

In the preceding embodiment, the groove 40 which receives the terminal convolution of the spring 34 is shown and described as cutting through the angles establishing the hexagonal cross section of the rod 26, and also recessed below the faces extending between such angles. It is to be recognized, however, that the groove 40 need not necessarily be recessed below the faces of the rod 26 across the entire width of such faces. Thus, a suitable interference to removal of the rod 26 from the tube 30 can be achieved even if the groove 40 cuts only through the angles of the rod 26, without cutting all the way across the faces thereof. In such cases, however, resistance to removal of the rod 26 from the tube 30 is limited approximately to the force needed to shear the wire of the spring diametrically across the wire. Where the wire is partially recessed into the faces of the rod 26, however, the area of metal that must be sheared before the rod 26 can be removed from the tube 30 is substantially increased. Furthermore the side walls of the groove 40 then brace the wire seated in the groove against flexure on impact with the divergent wall 38, with the result that the life of the assembly is extended. For the foregoing reasons it is preferred to recess the wire of the terminal convolution of the spring 34 partially into the faces of the rod 26.

Although the present invention has been described as applied to limiting the sliding movement of a hexagonal, or other polygonal shaft within a complementary tube section, it will be apparent to those skilled in the art that the same locking principles can be applied to other cross sectional shapes. Essentially any cross sectional shape capable of being circumscribed by a cylindrical surface and having one or more axially extending surfaces recessed within the circumscribing cylindrical surface can be provided with limited travel within a complementary tubular section using the present invention.

It will also be recognized that the use of the terminal convolution of the spring 34 to achieve the locking function is merely a convenient utilization of the spring normally employed in such torque couplings. It is thus within the purview of the present invention to employ alternative locking devices seated in the annular groove 40 and not necessarily attached to the spring 34.

FIGURES 3, 4 and 5 illustrate a modification wherein a snap ring is employed to effect the lock in lieu of the terminal convolution of a spring and also wherein modified structure enabling a different means of assembly is employed.

In the subject modification, as in the preferred embodiment, the torque coupling is illustrated as supplying a connection between universal joints. Thus, in the modification, a universal joint 50 having a coupling socket 52 is connected by means of the modified coupling to a universal joint 56, having a stub shaft 58 for connection to the torque coupling. The torque coupling comprises a hexagonal rod or shaft 62 secured in the coupling socket 52 by a dowel 64 and a tube 66 which slidably receives the rod 62. The tube 66 is seated upon the stub shaft 58 and pinned thereto by a dowel 68.

The interior of the tube 66 is characterized by an end section 74 having a hexagonal cross section complementary to the cross section of the rod 62 and an enlarged cylindrical extension 75. Between the hexagonal section 74 and the extension 75 is a rounded shoulder portion 84, which is generally divergent from the section 74 to the extension 75.

Adjacent the end of the rod 62 which projects into the tube 66 the rod has an annular recess 86. Between the recess 86 and the extreme inner end of the rod 62 is an annular groove 90 and extending between the groove 90 and the recess 86 is a conical wall portion 88 converging in the direction of the recess 86. The conical wall portion 88 has a maximum diameter exceeding the minimum diameter of the groove 90 with the result that an annular hump 92 exists between the groove 90 and the conical portion 88. For reasons which will become more apparent in the following, the hump 92 is preferably rounded as shown in FIGURE 4.

For the purpose of locking the rod 62 within the tube 66, a snap ring 94 is positioned in the recess 86. The snap ring 94 has an inner diameter, when relaxed, which is less than the diameter of the groove 90 at the base thereof and comprises a wire member having a length not greater than the circumference of the maximum circle which can be inscribed in the hexagonal section 74 of the tube 66. The snap ring 94 can therefore be compressed to a diameter which will slide through the hexagonal section 74. The wire diameter of the snap ring 94 is such that the wire diameter added to the diameter of the groove 90 is not as great as the diameter of the extension 75. Thus, the snap ring 94, when seated in the groove 90, does not interfere with free sliding movement of the rod 62 in the extension 75.

The assembly of the torque coupling in FIGURE 3 is accomplished in the following manner. The snap ring 94 is first placed in the recess 86 and compressed sufficiently that the snap ring along with the rod 62 can slide through the hexagonal section 74 of the tube 66. As the snap ring 94 enters the extension 75 of the tube 66, the snap ring expands to an outer diameter which is less than the diameter of the extension 75 but too great to slide into the hexagonal section 74 of the tube 66. After advancing the rod 62 into the tube 66 sufficiently to bring the snap ring 94 into the extension 75, the rod 62 is drawn rearwardly as if to remove the rod from the tube 66. This brings the snap ring 94 in contact with the rounded shoulder 84 in the tube 66, such that further movement of the rod 62, as if to pull the rod out of the tube 66, causes the snap ring 94 to slide along the conical wall portion 88 in the direction of the groove 90. The conical wall portion 88 forces the snap ring 94 to expand in diameter sufficiently to pass over the hump 92, whereupon the snap ring contracts to seat snugly in the groove 90.

With the snap ring 94 seated in the groove 90, the rod 62 cannot be removed from the tube 66 without shearing the snap ring circumferentially. Thus, the rod 62 is securely locked against removal from the tube 66.

Should removal of the rod 62 become necessary, as for repairs, one or more apertures such as the apertures 96a and 96b passing through the wall to the extension 75 are provided. These apertures permit insertion of a tool for blocking movement of the snap ring to the left as viewed in FIGURE 3, so that the rod 62 can be advanced into the extension 75 causing the snap ring 94 to expand over the hump 92 and slip back into the recess 86. By manipulation of tools, which may be rods, passing into both apertures 96a and 96b the snap ring 94 can be compressed sufficiently to enable removal of the snap ring and the rod 62 through the hexagonal section 74 in the tube 66. To facilitate accomplishment of this compressing operation more than one pair of diametrically disposed apertures 96a and 96b may be provided in the wall of the tube 66, so that the snap ring 94 can be conveniently engaged from diametrically opposite sides thereof approximately 90° away from the expansion gap therein.

As in the preferred embodiment, a coil spring is employed to take up play in the torque coupling. Thus, the modification of FIGURE 3 employs a coil spring 70 encircling the hexagonal rod 62. The spring 70 acts between the coupling socket 52 associated with the universal joint 50 and the confronting end of the tube 66. For protection of the spring 70, and as a safety feature, a sleeve 72 is fitted co-axially over the rod 62, one end of the sleeve 72 being seated over the coupling socket 52 of the joint 50 and secured thereto by the dowel 64. The other end of the sleeve 72 slides freely over the tube 66. Thus, the sleeve 72 moves in unison with the rod 62 without interfering with the telescopic capacity of the torque coupling.

To exclude dust and grit from the area of sliding contact between the rod 62 and hexagonal section 74 of the tube 66, gaskets such as shown at 78 and 82 may be employed, the gasket 78 being seated in an annular groove 76 in the outer periphery of the tube 66 and the gasket 82 being seated in an annular groove 80 in the outer periphery of the coupling socket 52.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A torque coupling comprising an elongated rod of substantially uniform cross section capable of circumscription by an imaginary cylindrical surface concentric therewith, said rod having an axially extending surface which upon circumscription of said rod is recessed within said circumscribing cylindrical surface, a tubular member having a section in which the interior wall of said tubular member complements the cross section of said rod and having an annular extension from said section, said section slidably receiving said rod, said interior wall interfitting said recessed surface so as to prevent relative rotation between said tubular member and said rod about the axis of said rod, said rod having an annular groove in the periphery thereof, said groove being disposed within said extension, and a spiral spring element disposed in said extension, a terminal convolution of said spring element being seated in said annular groove, said terminal convolution having a portion thereof traversing said recessed surface and elevated above said recessed surface so as to limit sliding movement of said rod relative to said tubular member by interference with said interior wall.

2. A torque coupling comprising an elongated rod of substantially uniform cross section capable of circumscription by an imaginary cylindrical surface concentric therewith, said rod having an axially extending surface which, upon circumscription of said rod, is recessed within said circumscribing cylindrical surface, a tubular member having a section in which the interior wall of said tubular member complements the cross section of said rod and having a cylindrical extension co-axial with said section in which the interior wall of said tube has a diameter exceeding the diameter of said circumscribing cylindrical surface, said section slidably receiving said rod, the portion of said interior wall of said section complementing said recessed surface of said rod interfitting said recessed surface so as to prevent relative rotation between said tubular member and said rod about the axis of said rod, said rod projecting into said extension and having an annular grooved portion within said extension capable of circumscription by a toroidal surface of revolution, said toroidal surface being concentric to said cylindrical surface, said rod having a conical surface portion located within said extension and adjacent said grooved portion, said conical surface portion diverging toward said grooved portion and away from said section of said tubular member, and a resilient snap ring seated in said annular grooved portion, said snap ring having a portion thereof traversing said recessed surface and elevated above said recessed surface so as to limit sliding movement of said rod relative to said tubular member by interference with the portion of said interior wall interfitting said recessed surface, said snap ring when seated in said annular groove having an outside diameter which is less than the inside diameter of said extension whereby said rod together with said snap ring slides axially in said extension without interference, said tubular member having an aperture through the wall of said extension whereby a suitable tool may be inserted for moving said snap ring from said annular groove and onto said conical surface to permit disassembly of said coupling.

3. In combination a rod having a substantially uniform cross section along its length interrupted by an annular recess in the periphery thereof and by an annular groove in the periphery thereof spaced from said recess, said annular recess having a depth into the periphery of said rod exceeding the depth of said annular groove, said rod having a conical wall extending between said groove and said recess and diverging toward said groove, said conical wall diverging to a diameter exceeding the minimum diameter of said groove, and a resilient snap ring disposed in said groove, said snap ring when seated in said groove having at least a portion projecting beyond the periphery of said rod, the construction and arrangement being such that said snap ring may be dislodged from said groove onto said conical wall.

4. The combination of claim 3 including tube means having a section interfitting the periphery of said rod and slidably receiving said rod, the construction and arrangement being such that upon said snap ring being seated in said recess, relative axial movement between said tube means and said rod causing said recess followed by said groove to move toward said interfitting section will cause said interfitting section to engage said snap ring and move said snap ring axially along said conical wall to expand then seat said snap ring in said groove.

References Cited

UNITED STATES PATENTS

| | | | |
|---|---|---|---|
| 1,412,561 | 4/1922 | McKenna et al. | 287—58 |
| 2,567,127 | 9/1951 | Shoffner | 64—23 |
| 2,696,090 | 12/1954 | Harrington | 64—23 |
| 2,890,072 | 6/1957 | Kaman et al. | 279—79 X |
| 2,919,941 | 1/1960 | Bohlman et al. | 287—58 |
| 2,926,033 | 2/1960 | Zarrillo | 287—52.05 |
| 3,002,365 | 10/1961 | Liljequist | 64—27 |
| 3,073,134 | 1/1963 | Mann | 64—23 |

HALL C. COE, *Primary Examiner.*